US008422945B2

(12) United States Patent
Doutriaux

(10) Patent No.: US 8,422,945 B2
(45) Date of Patent: Apr. 16, 2013

(54) COMPACT COMMUNICATION APPARATUS

(75) Inventor: Stéphane Doutriaux, Lausanne (CH)

(73) Assignee: Poken Holding AG, Kuessnacht SZ (CH)

( * ) Notice: Subject to any disclaimer, the term of this patent is extended or adjusted under 35 U.S.C. 154(b) by 662 days.

(21) Appl. No.: 12/597,946

(22) PCT Filed: Apr. 17, 2008

(86) PCT No.: PCT/EP2008/054697
§ 371 (c)(1), (2), (4) Date: Feb. 18, 2010

(87) PCT Pub. No.: WO2008/132065
PCT Pub. Date: Nov. 6, 2008

(65) Prior Publication Data

US 2010/0167648 A1 Jul. 1, 2010

Related U.S. Application Data

(63) Continuation of application No. 11/741,740, filed on Apr. 28, 2007, now abandoned.

(60) Provisional application No. 60/976,437, filed on Sep. 30, 2007, provisional application No. 60/984,152, filed on Oct. 31, 2007, provisional application No. 61/021,634, filed on Jan. 17, 2008.

(51) Int. Cl.
*H04B 5/00* (2006.01)

(52) U.S. Cl.
USPC ....................................... 455/41.1; 455/575.7

(58) Field of Classification Search ................. 455/41.1, 455/41.2, 41.3, 550.1, 562.1, 575.7, 90.3
See application file for complete search history.

(56) References Cited

U.S. PATENT DOCUMENTS 6,694,399 B1 2/2004 Leydier et al.
6,712,277 B2 3/2004 Spencer
6,848,045 B2 1/2005 Long et al.
6,897,778 B1 5/2005 Borlenghi
7,272,723 B1 9/2007 Abbott et al.
(Continued)

FOREIGN PATENT DOCUMENTS

DE 4431707 A1 9/1995
DE 29815067 U1 11/1998
(Continued)

*Primary Examiner* — Ping Hsieh
(74) *Attorney, Agent, or Firm* — Browdy and Niemark, PLLC

(57) ABSTRACT

A compact communication apparatus comprises: a processor module (104); a memory module (106); a wireless communication interface (108) and a mobile power source (114); wherein: the wireless communication interface (108) comprises short-range wireless communication module (110) and a physical alignment device (112), said physical alignment device (112) usable for aligning the compact communication apparatus with another compact communication apparatus containing a similar wireless communication interface (108) such that data communication can happen between the wireless communication modules (110); wherein the processor module (104) is adapted to act on the data received from the wireless communication module (110) and to store some related data, especially variables, to the memory module (106); wherein the mobile power source (114) is contained within the compact communication apparatus and provides the power to run at least said apparatus wireless communication interface (108) and processor module (104); wherein said compact communication apparatus optionally also comprises a connection module (102) for interfacing the compact apparatus with an Internet-capable appliance.

21 Claims, 8 Drawing Sheets

U.S. PATENT DOCUMENTS

| | | | | |
|---|---|---|---|---|
| 7,541,930 | B2 * | 6/2009 | Saarisalo et al. | 340/572.7 |
| 2003/0028797 | A1 | 2/2003 | Long et al. | |
| 2003/0102380 | A1 | 6/2003 | Spencer | |
| 2004/0092229 | A1 | 5/2004 | Hessel | |
| 2004/0203365 | A1 * | 10/2004 | Yamamoto et al. | 455/41.2 |
| 2010/0056047 | A1 * | 3/2010 | Bertin | 455/41.1 |

FOREIGN PATENT DOCUMENTS

| | | | |
|---|---|---|---|
| EP | 0919968 | A1 | 6/1999 |
| EP | 1079337 | A | 2/2001 |
| FR | 2884332 | A | 10/2006 |
| JP | 2001-266091 | A1 | 9/2001 |
| JP | 2002-207981 | | 7/2002 |
| JP | 2006-524838 | A | 11/2006 |
| WO | 97/24627 | A1 | 7/1997 |
| WO | 00/42491 | | 7/2000 |
| WO | 0042491 | A1 | 7/2000 |
| WO | 2004/086288 | A2 | 10/2004 |

* cited by examiner

COMPACT COMMUNICATION APPARATUS

BACKGROUND OF THE INVENTION

1. Technical Field

This invention relates generally a compact communication apparatus especially but not only suited to applications in the field of Social Networking but also relates to applications using RFID and NFC.

2. Related Art

Passive radio frequency identification (RFID) devices derive their energy from the electromagnetic field radiated from the reader. Because of international power transmission restrictions at the frequencies of 125 KHz and 13.56 MHz, the contactless integrated circuits are generally low voltage and low power devices. Read/Write circuits use low voltage EEPROM and low power analogue cells.

The main focus of the RFID and NFC industry has been on applications requiring one passive device, that contains no power source, and one active device that radiates an electromagnetic field sufficiently strong to generate power for the passive device to transmit some form of digital content. An active device may be for example an RFID hand-held reader which is used to read RFID tags in a warehouse; It may also be a cell-phone which is used to read passive RFID tags enabling it to automatically configure its Wifi or Bluetooth parameters, or it may be a reader built-into a bank machine, a city bus, or a secure location and used to read an individual's credentials contained in a passive RFID card or other medium.

Passive RFID tags are generally paper-thin and may be integrated into ID cards, posters, or any product that needs to be tracked in a supply-chain environment.

3. Related Patents and/or Publications

US 2003/0028797 discloses an integrated USB connector for personal token. A personal key having an inexpensive and robust integrated USB connector is disclosed. The apparatus comprises a circuit board having a processor and a plurality of conductive traces communicatively coupling the processor to a peripheral portion of the circuit board. The plurality of conductive traces includes, for example, a power trace, a ground trace, and at least two signal traces. The apparatus also comprises a first housing, having an aperture configured to accept the periphery of the circuit board therethrough, thereby presenting the plurality of conductive traces exterior to the aperture. The apparatus also comprises a shell, surrounding the plurality of conductive traces, the shell including at least one locking member interfacing with the first housing.

US 2003/0102380 discloses a memory card and a method for operating a memory card, the memory card comprising: a memory mass storage; a first data interface with a contacting interface and a high data transfer rate; a second data interface with a contact-less interface. In a preferred embodiment, a memory card controller is included for selecting a first data line from said first data interface or a second data line from said second data interface to communicate with said memory mass storage based on a criteria.

WO 00/42491 discloses an USB-Compliant Personal Key with Integral Input and Output Devices. A compact, self-contained, personal key is disclosed. The personal key comprises a USB-compliant interface releasably coupleable to a host processing device; a memory; and a processor. The processor provides the host processing device conditional access to data storable in the memory as well as the functionality required to manage files stored in the personal key and for performing computations based on the data in the files. In one embodiment, the personal key also comprises an integral user input device and an integral user output device. The input and output devices communicate with the processor by communication paths which are independent from the USB-compliant interface, and thus allow the user to communicate with the processor without manifesting any private information external to the personal key.

U.S. Pat. No. 6,694,399 discloses a method and a device for universal serial bus smart card traffic signaling. A method and device are disclosed for detecting successful transfers between a Universal Serial Bus (USB) port and a USB smart card and generating a signal that provides an indication of the USB transaction activity. This USB transaction activity signal is modulated according to the USB transaction activity and drives a Light Emitting Diode (LED) in a preferred embodiment of the invention. A counter internal to the USB smart card scales the transaction activity signal such that it is perceptible to the user. Because the current through the LED depends upon the USB transaction activity, the brightness of the LED varies according to the USB transaction activity. The LED may be driven from a current mirror sink or source, or a current switch sink or source.

Apart from using USB memory devices for file storage, they are also used for desktop settings, screen lock, network login & access control, log book, user authentication (storing digital signatures, certificates, key sets, finger-based biometric templates, usernames and passwords), digital content and transaction security as well as enterprise and Internet security.

A USB memory device can also be used to download emails, remotely access a PC or to open a customised browser that allows the user to surf the Web with total privacy.

Recent developments in USB flash memory drives have resulted in CDROM-like auto-run devices that automatically execute a file when the USB token is inserted into a PC. The read-only and auto-run contents are installed during the manufacturing process. Examples of auto-run contents include opening a website, running a demo application, showing a presentation, making a product pitch, providing customers with discount coupons etc.

The main focus of the flash drive industry is on high density memory (using NAND flash memory cells) and current USB key chain products from the market leaders incorporate an 8-Gigabyte flash memory chip, managed by a 32 bit microcontroller. These large capacity, personal, portable storage devices are for decentralised applications to transport confidential business documents, multimedia files, photos, music files, address book, favorite web sites, games, etc.

BRIEF DESCRIPTION (SUMMARY) OF THE INVENTION

One novel aspect of this invention is in filling a need that is not addressed by the known active/passive nature of the short-range RFID and NFC technologies.

RFID can be classified in three types of devices:

passive: have no power source, power is beamed to them from somewhere else through radio waves;

semi-active: passive device that contains a battery, but whose only purpose is to keep a small process running on-board such as reading the ambient temperature. The power source is not used for the communication (not strong enough), so again a semi-active device is like a passive device in that it needs a bulky active device nearby to beam power to it; and active: have a relatively large power source and are bulky since they need to beam power to any passive or semi-active device in order to power them up at a distance and make them function.

Because an active RFID device needs to provide enough energy to power its passive RFID peer at a distance, active RFID devices are generally quite bulky (as compared to a USB memory stick) because they require a significant power source. Passive RFID devices on the other hand have no internal source of power and so cannot function on their own or amongst each-other.

One aspect of our invention is that the device is neither active, passive or semi-active in the traditional sense. When two devices according to the invention are used together, they act somewhat like semi-active RFID devices except that the communication and the power consumption was tailored and adapted so that the onboard battery can also power the wireless communication between two of these devices. Unlike RFID, it is not needed to beam power to another device. Each one of the devices has its own small power source and is self-sufficient. This advantage is inter alia—achieved through the matching alignment of the devices for communication.

While many applications require transferring small amounts of data between an RFID tag and a rather bulky reader, we have conceived of new applications which require transferring small amounts of data between two very compact, portable, low-cost devices. The present invention describes such a device as we have constructed, where a plurality of such devices are capable of exchanging small amounts of data between each-other.

The invention is generally a compact personal apparatus which can spontaneously communicate with its kin when they are essentially touching (so the mating is intended by their users). The apparatus can also be plugged into a personal computer and interfaced with the Virtual World of the Internet. When the device is removed from the personal computer it can be used in the Read World to create "connections" with other individuals that are equipped with one, such that the user and those other individuals will be connected in the Virtual World after the next connection of the device with a personal computer. Those individuals will then be able to transact in the Virtual World, as they will have access to information about each-other as may be made available to them through a social networking website or an address book entry.

The compact personal apparatus is suitably in the general form of a USB memory stick, resembling a USB memory fob. The compact personal apparatus comprises a short-range wireless interface as well as a USB or other common PC interface.

With regard to a personal apparatus being something "which can be plugged into a personal computer", it is clearly within the scope of this invention, and based on the teachings set forth herein one of ordinary skill in the art would recognize that: the "apparatus" can take on a form other than that of resembling a USB memory fob, as long as its functionality is generally along the lines of that described herein; and the "personal computer" can be any apparatus which is capable of interacting with the compact apparatus (or the like), so long as the apparatus is a device capable of interacting with the data contained in the apparatus (or the like).

In light of these considerations, and other comparisons (an exemplary "other comparison" would be the well-accepted definition of "software" set forth hereinabove which defines "software" as the non-hardware part of a computer, handheld or smartphone . . . ) set forth in this document, the preceding paragraph (i.e., "The invention is generally . . . comprises a wireless interface.") can reasonably and justifiably be read and interpreted as follows:

The invention is generally a compact personal apparatus which in some embodiments can be by means of standard-compliant interfaces (described herein) connected to a personal computer and/or other internet capable devices such as; cell phones, personal digital assistants (PDA), internet appliances, etc. and interfaced with the virtual world of the Internet. The apparatus can then be removed from the personal computer and used to conduct real world transactions. The compact personal token apparatus is suitably in the general form of a fob, resembling a USB memory fob. In some implementations it will be integrated into a toy or another enclosure which will not alter its function but may give it a substantially different appearance. The compact personal token apparatus generally comprises a short-range wireless interface or radio-frequency interface and a physical means of alignment such as a magnet, which helps align the wireless communication components of two such devices such that data communication can happen.

The compact personal apparatus (or equivalent) will generally not remain in the apparatus capable of interacting with Virtual World (e.g., computer, cell phone, PDA), when the personal compact device communicates wirelessly with its kin in the real world. It is, however, not necessary to remove it from the host device.

This invention comprises primarily a processor module; a memory module; a wireless communication interface and a mobile power source; wherein: the wireless communication interface comprises short-range wireless communication module and a physical alignment device, said physical alignment device used for aligning the compact apparatus with another compact apparatus containing a similar wireless communication interface such that data communication can happen between the wireless communication modules; wherein the processor module acts in some way on the data received from the wireless communication module and stores some related variables to the memory module; wherein the mobile power source in contained within the compact apparatus and provides the power to run at least said apparatus' wireless communication interface and processor module; said compact apparatus may also comprise a connection module for interfacing the compact apparatus with an Internet-capable appliance;

Further, the physical alignment device may contain at least one magnet, or have a physical shape which is indicative of its primary function which is to help align said compact apparatus to another compatible compact apparatus in such a way that the short-range wireless communication circuitry of both devices can communicate.

A method of exchanging data is also presented, comprising: providing two individuals each with a device containing at least: a processor module, a compact mobile power source and a wireless communication interface; said wireless communication interface comprising a wireless communication module and a physical means to help align said device with another compatible device, the first device being capable of transferring data to the second device through their wireless communication modules conditional to the proper physical alignment of the devices as defined by said physical means; The individuals positioning their devices in such a way that the data transfer can occur.

This method may further comprise: interfacing the second device, which would contain a connection module, through its connection module to an Internet-capable appliance such that the data transferred from the first device is made available to applications running on the Internet-capable appliance or to applications on the Web. The interface with the Internet-capable appliance is selected from the group consisting of USB, FireWire, IR, Bluetooth, standard serial port, WLAN, RFID, NFC, Wifi.

The Internet-capable appliance may comprises of a device selected from the group consisting of personal computer (PC), laptop, PDA, MP3 player and cell phone.

Another method is proposed for linking the profiles of individuals in the Virtual World of the Internet by having said individuals engage in a Real World transaction using a compact apparatus provided primarily for this purpose, comprising: providing both individuals with a compact apparatus, comprising: a connection module for interfacing the personal token apparatus with an Internet-capable appliance; a means for moving data between two similar apparatuses such as a short-range wireless communication module within each apparatus; having the individuals interact in the Real World by positioning their respective apparatus in close proximity such that a least one digital identifier is exchanged between them; and having at least one of the individuals connect his compact apparatus to a host Internet-capable appliance such that the information relating to the exchange of identifier is transferred to an application running on the host or to an application on the Web.

One of the individuals involved in the transaction may not be a person, but rather a booth or any a location where a compatible apparatus may have been placed for the purpose of interacting with it.

Another method is proposed restricting the interaction of individuals in the Virtual World of the Internet to interactions between those same individuals that each individual may have interacted with in the Real World, said method comprising: providing a compact apparatus to each individual, having the individuals interact in the Real World by positioning their respective apparatus in close proximity such that a least one digital identifier is exchanged between them; and having at least one of the individuals connect his compact apparatus to a host Internet-capable appliance such that the information relating to the interaction of the individuals in the Real World is transferred to an application running on the host or to an application on the Web; said apparatus, comprising: a connection module for interfacing the personal token apparatus with an Internet-capable appliance; a means for moving data between two similar apparatuses such as a wireless communication module within each apparatus; a processor module for processing the data passed to and from the wireless communication module; a compact power source providing power to the processor module and to the wireless communication module.

Based on the teachings set forth herein, it would readily be understood by one of ordinary skill in the art that the functionality of the present invention, in its various embodiments, could be realized in a different format than a fob and in a different manner than by plugging the fob into the USB port of a personal computer (PC). For example, the apparatus of the present invention can be embodied in a format (form factor) such as that of an SD (secure digital) card which can be plugged into any device having an appropriate interface for inserting an SD card, such as a laptop, palmtop, cell phone, digital camera, personal digital assistant (PDA), MP3 player, or the like.

In any of the embodiments discussed herein (particularly those using a PC), a memory card reader may be attached to the PC. (PCs in Europe commonly come with memory card readers for several different memory card formats including, but not limited to, Secure Digital (SD) card format.

Many exemplary features and embodiments of, as well as applications for the smart fob (or comparable) of the present invention are described hereinbelow.

A compact apparatus is provided, which can be plugged into a PC and transfer data to it, or to the virtual world of the Internet, which it has collected through a secondary interface. The apparatus is capable of loading and storing information transmitted to it by similar compact apparatuses through a secondary interface. This information is stored in the apparatus' flash memory or EEPROM, and then available to the communications module that interfaces with the PC when said apparatus is connected to a PC. The apparatus is capable of implementing an auto-run application, when inserted into a personal computer.

Other objects, features and advantages of the invention will become apparent in light of the following description thereof.

The disclosure of the co-pending U.S. application Ser. No. 11/741,740, filed on 28 Apr. 2007, as well as the disclosure of the three provisional U.S. patent application Ser. No. 60/976,437, filed on 30 Sep. 2007, Ser. No. 60/984,152, filed on 31 Oct. 2007, as well as Ser. No. 61/021,634, filed on 17 Jan. 2008, are incorporated by reference and their priority is claimed.

BRIEF DESCRIPTION OF THE DRAWINGS

The structure, operation, and advantages of the present preferred embodiment of the invention will become further apparent upon consideration of the descriptions set forth herein, taken in conjunction with the accompanying figures. The figures are intended to be illustrative, not limiting. Although the invention is generally described in the context of these preferred embodiments, it should be understood that it is not intended to limit the spirit and scope of the invention to these particular embodiments.

DETAILED DESCRIPTION OF THE INVENTION

This invention relates generally to devices, technology and applications for linking individuals in one "world" such as the virtual world of the Internet and, with the device, interacting, typically contactlessly, with another "world" such as the physical world of conventions, bars, offices, stores, social gatherings and the like, and providing them further services.

Generally, this is done by exchanging a piece of personal identification in the real world by traditional means, such as exchanging business cards, telephone numbers, a personal account number, an email address, or an identification code specific to a website. Individuals can then "link" themselves in the virtual world of the Internet on websites commonly known as "Social Networking" websites (such as Facebook, LinkedIn, MySpace), or link themselves through applications that keep track of their personal information (such as Plaxo) by typing into these websites or applications another individual's personal identification information (or by selecting the other individual in a list provided by the website or application).

In many embodiments, the device interacts in the physical world using a short-range wireless interface, which may be proprietary or follow some standard similar to NFC or RFID. In some embodiments, the device plugs into a PC using a standard contact interface, such as USB. Several embodiments and several applications applicable to various ones of the embodiments are discussed.

In an embodiment, the device is in the form of a compact apparatus, resembling a conventional USB memory fob (size, shape, form) which can be plugged into an apparatus such as a personal computer (PC) and interfaced with the virtual world of the Internet. The device is capable of using stored information or values via its wireless interface in the real world, storing information to its flash memory (memory that can be erased and reprogrammed in blocks) or EEPROM and then transferring it to the Internet, via the PC. Similarly, the device is capable of implementing an auto-run application, when inserted into a personal computer (PC) connected to the Internet, and information exchanged and stored can be accessed in the real world application via its wireless interface. The apparatus is capable of exchanging information with other devices having compatible interfaces.

Figure 1:
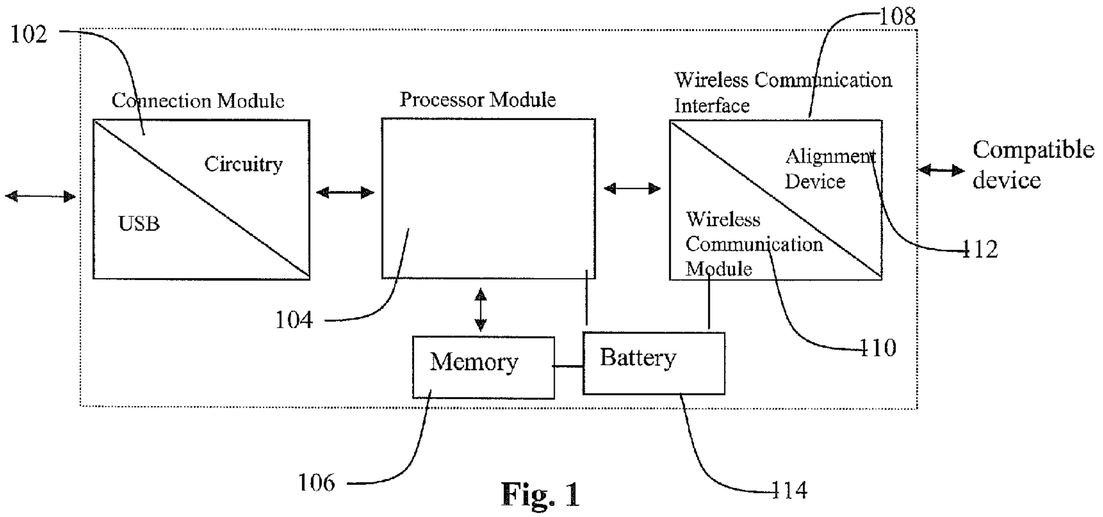
FIG. 1 is a schematic block diagram of an embodiment of the invention comprising a connection module.

FIG. 1 is a schematic block diagram of an exemplary embodiment 100 of the invention employing an 8-bit microprocessor and having five modules, all interconnected as shown to provide the contemplated functionality of the present invention. The major components, e.g. mounted on a circuit board (PCB, not shown) and within a housing (not shown) are (from left-to-right): a connection module 102; a processor module 104; a memory module 106; a wireless communication interface 108 and a compact power source 114.

The connection module 102 is for interfacing the device with a personal computer (not shown) apparatus, or other appliance capable of communicating and interacting with remote servers and networks, especially but not exclusively over the internet. In the example of the compact apparatus according to FIG. 1, the connection module 102 can comprise a USB plug, for plugging directly into a personal computer (PC). Other possibilities for connecting (communicating) with the personal computer are FireWire, IR, Bluetooth, standard serial port, WLAN, etc., basically any suitable interface between an external memory/processing apparatus and a personal computer.

The connection module 102 is typically for inputting data to the virtual world of the Internet from the device, via the PC or other Internet capable appliance, and in some cases inputting some data to the device from the PC or the Internet. The particular plug or connection interface 102 which is used is whatever is known to someone skilled in the art. The device is not limited to communicating with other entities via the "Internet", but can communicate via other networks or internets. These comments apply to other embodiments described herein.

The invention should not be limited to a particular form of interface/communication protocol. The point is that the device can interact with the virtual world via an Internet-capable appliance. One of ordinary skill in the art will recognize, and it is within the scope of the invention that other possibilities for what has been described as "devices capable of communicating and interacting with remote servers and networks" are PDAs, cell phones, etc., not only personal computers—basically, any (what is referred to elsewhere as) "host device" or "host processing device".

The processor module 104 is for controlling operation of the compact apparatus ("device") of the present invention. It is, for example, an 8-bit microcontroller from such suppliers as Freescale, Atmel, Pic etc. It is capable of interfacing from ISO 7816 (contact interface) to either analog or digital signals, and it may contain NFC or RFID communication technology.

The memory module 106, which may be contained inside the processor module 104, is standard Flash or EEPROM memory as is commonly used in USB Memory Stick devices. The processor module can incorporate the memory module. The memory can further comprise a flash memory.

The Wireless Communication Interface 108 comprises a wireless communication module 110 and an alignment device 112. The wireless communication module 110 may be an induction-based device or RF antenna and a modulator, etc. Alternatively, the output module comprises a set of contacts which can contact another similar device as the one described in the present invention. The alignment device 112 is shown in connection with the Wireless Communication Interface 108 since the correct intended alignment of the device according to the invention and thus of the wireless communication module 108 is mandatory to allow the operation (transmittal of data) of the wireless communication module 108. Of course, it is possible that the alignment device 112 is formed within the housing of the device.

The compact apparatus can also comprise a display, especially a LCD screen or an e-Ink display.

The compact power source 114 is generally one of a small battery, a capacitor, a solar cell, a fuel cell or any other small mobile power source which can be integrated into the size of a device as is presented here.

The mobile power source 114 contained within the compact communication apparatus provides the power to run at least said apparatus' wireless communication interface 108 and processor module 104 at least at specific time intervals. Said time periods can be initiated through actuation of a switch or can be initiated through a movement generating an initial power surge to determine the presence of a second compact apparatus within reach. The actuation of the switch can be effected by the user on a specific switch its own apparatus or it is possible to provide wire connections within the alignment device 112 of the compact apparatus. Then these wire connections within the alignment device 112 are closing a circuitry, i.e. creating said switching element, upon physical mating alignment of two communication apparatuses of the invention for automatic detection of a mating communication apparatus and to initiate the wireless communication. This allows an efficient use of limited battery resources.

Figure 2:
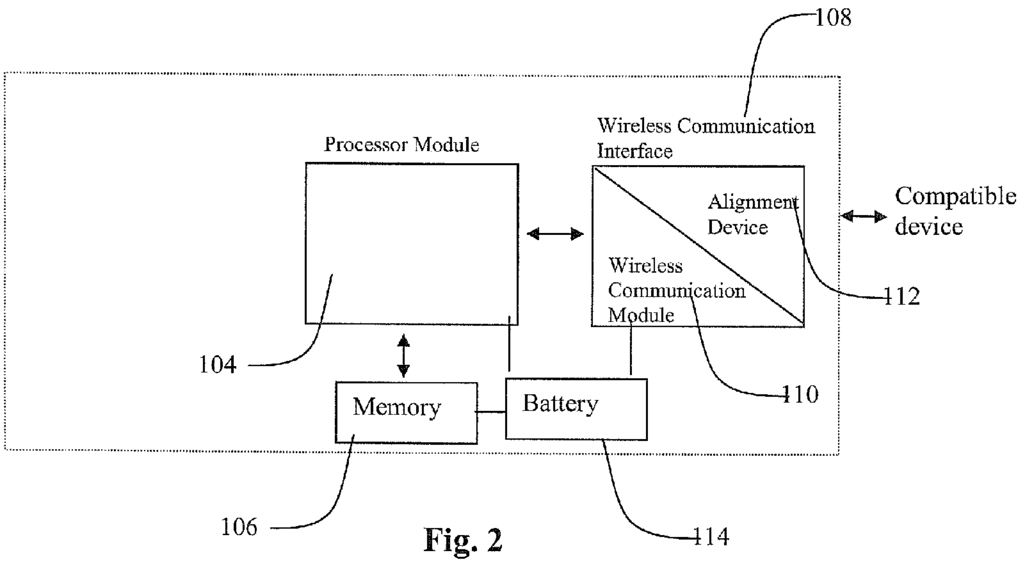
FIG. 2 is a schematic block diagram of an embodiment of the invention which does not have a connection module.

FIG. 2 illustrates the same as FIG. 1 with the only difference being that the embodiment presented in this figure does not have a connection module 102 to interface with a PC or an Internet appliance. It can be possible to use the wireless communication module 110 for such communication with an Internet appliance.

Figure 3:
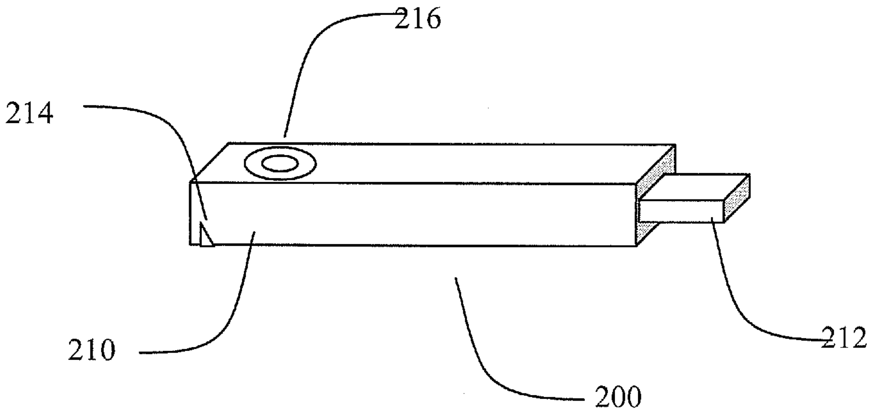
FIG. 3 is a schematic perspective view of an embodiment of the invention comprising a connection module.

FIG. 3 illustrates an exemplary embodiment which is generally in the form of a "smart fob" apparatus, having the general physical configuration (size, shape, form) of a conventional USB memory fob. This is basically a device 200 having the elongate size and general shape of a finger, comprising a main body portion 210 housing the electronics (c£ the modules 104, 106, 108, 114 according to FIG. 1) and a USB plug 212 (cf. 102) extending from an end of the body portion 210. A hole 214 may be provided for suspending the device 200 from a keychain (not shown). The physical alignment device 216 (cf. 112) is generally visible either in the form of a printed icon if it is magnetic, or in the form of a physical shape which suggests to the user that this is where another compatible device should be positioned for use.

In one sample embodiment the device has the general appearance of a cartoon-style hand, with five fingers extended. The alignment of the two devices is suggested to the user as two hands would be placed against each-other palm-to-palm, suggestive of a high-five type handshake Furthermore, magnets are present in two of the fingers (the left-most and the right-most) such that when the devices a put in close proximity to one another they are attracted in the right position for the short-range wireless communication to take place. In this hand-shaped embodiment the antenna is placed in the palm of the hand, and the wireless communication can happen when the devices are at most 1 to 5 mm from each-other and placed with the palms essentially facing each-other.

It is of course also possible to give the fingers of such a hand specific orientations, so that the distance between the two antennas within the two devices as can be under-run only when the fingers are mechanically oriented in a specific orientation. Such mechanical mating features are preferably arranged in a point-symmetric manner around the signal transmittal axis of the antenna so that identical devices can be oriented in a mating manner, so that they are closer than the maximum distance to initiate data transmission between the two devices.

The "compact apparatus" may be referred to herein as "smart fob" (without prejudice to any trademark rights which may be claimed). Now that its functionality has been described ("smart") and an exemplary physical form ("fob") has been described, the device will typically be referred to simply as the smart fob (without quotation marks).

Figure 4:
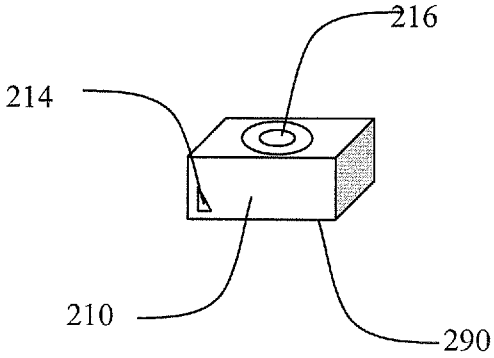
FIG. 4 is a schematic perspective view of an embodiment of the invention which does not have a connection module.

FIG. 4 illustrates a similar device 290 as FIG. 3 with the only difference being that the embodiment presented in this figure does not have a connection module to interface with a PC or an Internet appliance.

Figure 5:
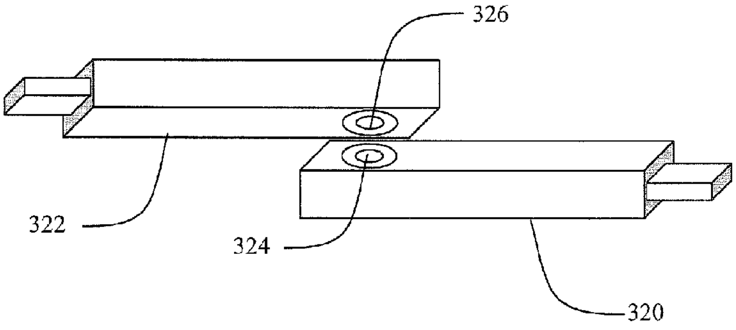
FIG. 5 is a schematic perspective view of two embodiments according to FIG. 3 in the process of being aligned for communication.

FIG. 5 illustrates two embodiments according to FIG. 3, receiving the reference numerals 320 and 322 of the smart fob, again in the general form of a USB memory fob. These embodiments are illustrated in close proximity to one another, showing how the physical alignment device 324, 326 (cf. 216, 112) of each of them could suggest to the user how to align the devices for use.

Figure 6:
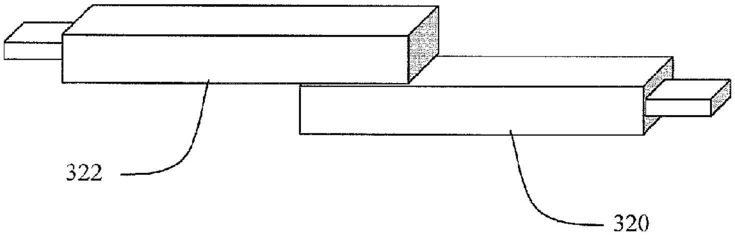
FIG. 6 is a schematic perspective view of the two embodiments of FIG. 5 aligned properly and able to communicate.

FIG. 6 illustrates the same two smart fobs 320 and 322 in their final resting position once the physical alignment devices have been properly aligned, and thus capable of communicating by exchanging data through their wireless communication modules (cf. 110)

Figure 7:
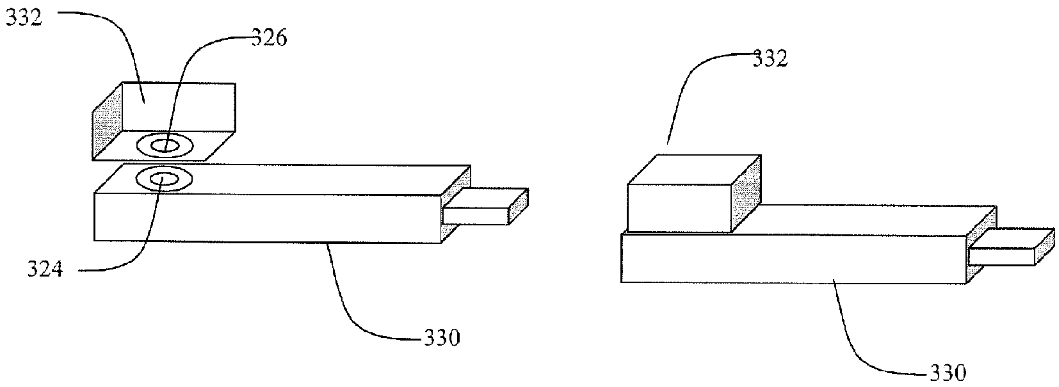
FIG. 7 are two schematic perspective views of two different embodiments, according to FIGS. 3 and 4, in the process of being aligned, then aligned properly and able to communicate.

FIG. 7 illustrates two other embodiments 330 and 332 of the smart fob, one in the general form of a USB memory fob 330, the other in the form of a similar-sized device without an USB connector 332. These embodiments are illustrated in close proximity to one another, showing how the physical alignment device 324, 326 (cf. 216, 112) of each of them could suggest to the user how to align the devices for use on the left side of FIG. 7 and in their final resting position once the physical alignment devices have been properly aligned on the right side of FIG. 7.

Figure 8:
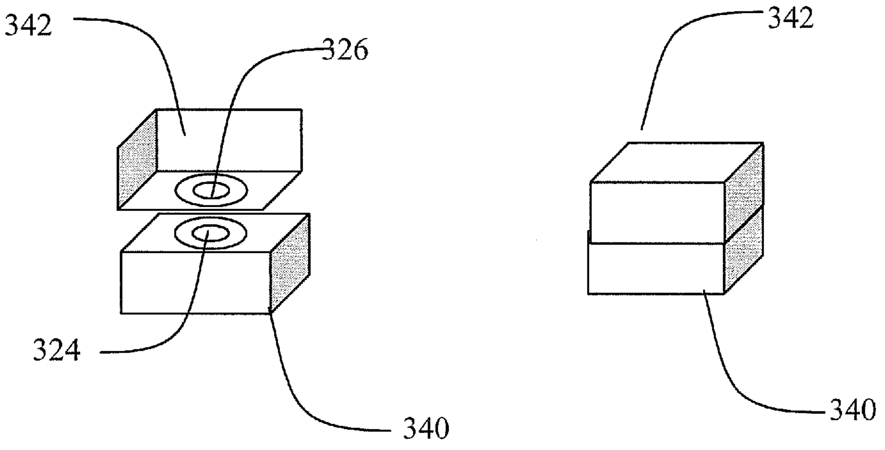
FIG. 8 are two schematic perspective views of two embodiments according to FIG. 4 in the process of being aligned, then aligned properly and able to communicate.

FIG. 8 illustrates two other embodiments of smart fobs 340 and 342 in close proximity to one another on the left side of FIG. 8 and in their final resting position once the physical alignment devices have been properly aligned on the right side of FIG. 8, and thus capable of communicating by exchanging data through their wireless communication modules (cf. 110)

Figure 9:
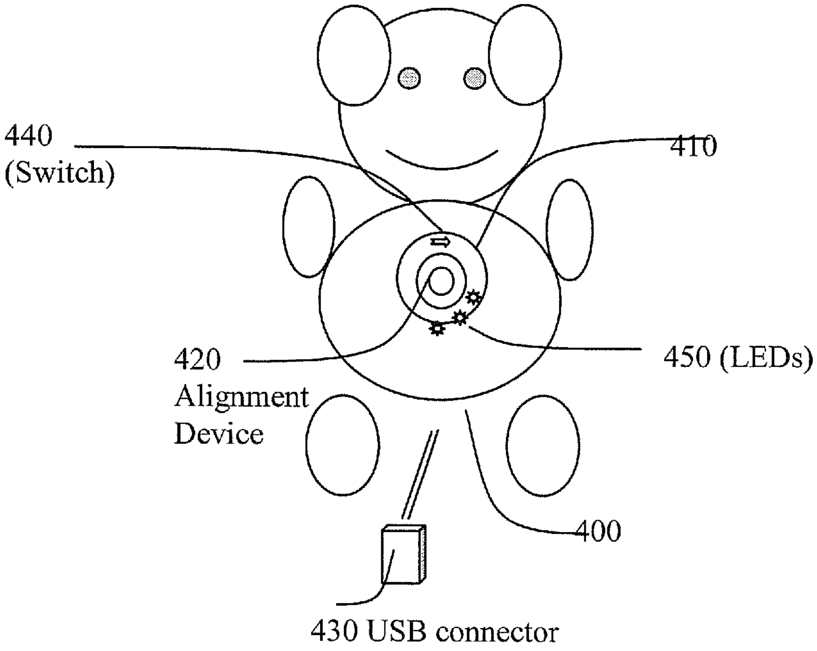
FIG. 9 is a frontal view of a further embodiment of the invention that has the general appearance of a stuffed toy animal.

FIG. 9 illustrates another embodiment of the invention where the compact apparatus is integrated into a toy 400. It remains that the compact apparatus has the same general functionality and the physical characteristics that are crucial to achieving this functionality are the same: the compact apparatus 410 contains a physical alignment device 420 and a connection module 430 illustrated here in the general form of a male USB connector, which can be arranged e.g. in a leg of the toy.

Other input and output devices, such as switches 440 and LEDs 450 (light-emitting diodes), could readily be added to any of the devices, one sample embodiment is shown in FIG. 9.

The smart fob of the present invention can be implemented in forms other than that of resembling a conventional USB key fob, including a compact module designed to be integrated into other products such, such as a toy or an unrelated keychain-sized device.

The form that the invention takes is largely dictated by the environment in which the user will use it, such as in a business environment or a children's playground.

Applications/Use

Making Social Connections

The invention is an application that uses the compact personal apparatus referred to herein as smart fob (again, this term is being used without prejudice to any trademark rights which may be claimed). The apparatus may also be referred to simply as "fob", or "personal device".

The fob is primarily intended for use as a tool for efficiently recording a social connection. Two individuals equipped with smart fobs will be able to quickly exchange their contact information by simply pressing their two fobs together, according to a the two steps shown in FIGS. 5 and 6 or in the representations of FIG. 7 or 8. They will then be able to login to a social networking website or an application recording their contacts, which will use the other person's unique identifier, transferred into the other person's fob, automatically locate his most recent contact data on a remote server. These individuals may for example be automatically "linked" in an online social networking environment, or there may simply be a mention in their profiles that they have met in person, possibly at a specific time and place.

Using the smart fob to record Real World social interactions can lead to a plethora of new and exciting applications for social networking. Another example may be that a social networking site only wishes to acknowledge links between people who have met in person. Individuals would use their fobs to validate their real-world meeting.

For some applications some of the compact apparatuses do not require a connection to an Internet-capable device; in those instances the apparatuses may not have a means to be connected to an internet-capable device. For example, such a device may be used as a promotional game in a casino, whereby customers are given such devices, which contain unique identifiers, and those devices can be "played" or "linked" to other similar devices in order to reveal whether the unique identifier is a winning identifier (it may have been pre-selected by a computer software program, or by a jury, or comply with some rules implemented as part of a selection mechanism by the organisers of the promotional game).

Alternately, compact apparatuses without a connection module and so with no means to be directly connected to an Internet-capable device may be used in a similar fashion as the fobs described above to record social connections or other Real World events: As an example, such a fob may be used by an individual and connected to fobs to record social interactions (as part of a game or for online linking purposes); When it is linked to other fobs some event happens within the fob such as determining that there is a correlation between the identifiers of the two individuals, and the user is alerted as to this event by a change in the light pattern of LEDs integrated into the fob. Eventually, if the user connects his fob to a fob that is connectable to an Internet-capable device, then the history of all these interactions, or the recorded result of these interactions, may be uploaded to the interne by the fob capable of doing so.

Downloading, Storing and Using Electronic Coupons ("E-Coupons").

The basic concept allows users to visit a conference, a convention or a store offering virtual coupons and (1) use the fob to "capture" the "e-coupons" ID, then (2) take the fob with them to their house or office, connect the fob to an Internet-capable appliance—and redeem the coupons on a website, or gain access to a restricted-access websites or applications.

This provides the ability for the consumer to walk around a convention or a shopping mall and store electronically, on a personal device—(referred to as the "fob")—a large number of coupons or specific information about products about which the user would like more information and then take that device to their computer to gain access to further information on-line.

Children's Game Using the Fob

A safe social networking game, especially for children 4-11 years old, is conceived using the invention described hereinabove. This game is of the sort observable in the market today whereby a new type of children's toy, sold with a unique code giving access to online games. Such successes as Webkinz, Kookeys, or Ty-Girlz, have led us to conceive of a new social networking concept for young children, ages 4 to 11, using our innovation described in this paper. This application leads to a truly SAFE social networking environment for children. The aim is to provide highly entertaining activities both online and offline, encouraging children to play together and interact in the real world as well as on the Web.

All current Webkins-style hybrid (online-offline) games for children this age are based on the simple concept that the toy is sold with a tag embroidered with a unique identifier giving access to the online "clone" of the toy. The physical toy can be a basic stuffed animal with no additional features.

Our proposed toy collection integrating the personal compact apparatus offers significant advantages of the current toys available. In the paragraphs that follow, we will cover the physical characteristics, noting the differences with current toys, as well as the online characteristics that will differentiate us from current games.

While the actual physical look and feel of the toy collection has not been defined, for the purpose of describing the innovation we will use the example of toys that are seemingly identical to Webkinz in terms of "look and feel". In reality the toys developed with the personal compact apparatus inside will be developed to have their own unique brand image, optimized for maximum adoption by the target consumer segment.

Therefore, for the purpose of this discussion, the toys relating to this invention will have roughly the following physical characteristics:

1) Standard-looking stuffed animal approximately the size of a large coffee mug.

2) Retractable USB connector (may be hidden in the tail or leg or other extremity) or any other type of connector as described in this patent application and used for data sharing between the personal apparatus and a computer.

3) A device which has the characteristics and the functionality described in this specification, is attached to or integrated within the toy.

In addition to the main toy collection a collection of smaller Everyday Objects will bring in a novel twist to the collection of plush toys forming part of the game as there is currently no other hybrid game of the Webkinz sort which includes Everyday Objects that differ in characteristic to the main, character-based plush toy series.

The Everyday Objects have the following characteristics: 1) Standard-looking stuffed toy which vary in size from approximately a third of the size of the main Toys to magnitudes larger than the Toys depending on their function (an apple versus a car). 2) The collection of Everyday Objects may vary in terms of the types of objects and the total number of objects, but in general they may be stylized versions of everyday objects. 3) A device which has the characteristics and the functionality described in this patent, but which may not have a connection module to interface with a computer, is attached to or integrated within the Object. 4) the Objects may or may not have a retractable USB connector or any other connector enabling the electronics contained within them to exchange data with a computer. We think at this stage that the Objects will not need to communicate directly with a computer, they will always communicate with the other Toys or Objects via their integrated short-range wireless communication module. The so-called Virtual World in this case may be an online portal which owners of the Toys can access by connecting their toy containing our compact apparatus to a computer. The basics of this application of our compact apparatus are to enable children to get together with their friends and match their Toys and Objects together, such that the combinations of Toys and Objects are recorded by the integrated personal compact apparatus and give access to advanced functions in the Virtual World such as connecting the children in a safe online social networking environment.

The elements described above differ considerably from the currently available games for children 4 to 11 years old in the following very novel elements:

Secure Social Networking

By "matching" his Toy to his friend's Toy, the children become "connected" in the online world. This "connectedness" puts both children in the same "village" or online community—so the children can see their friend's Virtual Toy in the same online portal where their own Toy is represented by a Virtual Toy. They are now in the same social network, and can interact with their online friends, with features such as: Chatting, Blogging, Videoconferencing, Playing games together or against each-other, Participating in activities relating to their village (described in greater later in this document).

The novel SECURITY aspect of this application of the Invention is that you child can only be networked with the people with whom they interact in real life. This is an entirely new approach to ensuring that children are not in contact with unwanted individuals over the internet. Competing "secure" social networking website for children rely on a parent's patrolling of their child's online activities, first by validating their child's account with their own credit card information, then being regularly informed of their child's online activities through automated emails send to them by the sites. The advantages to our solution are numerous, our main claim being that parents do not need to police their child's online activities any more than they police their child's real-world activities. The people that their child can interact with in his online world are limited to the same people that their child interacts with in real life. This may provide encouragement for the child to actually meet more frequently with friends or cousins in real life, if only to "match" their Toys and share Objects.

Similarly to how the Toys can be "matched" between themselves, the Objects can be matched with the Toys. With this "matching" we introduce a notion of decreasing value, such as we may attribute to "new" versus "used" objects. Taking an Apple Object as an example, the value [points gained from matching] may be attributed as follows:

The first Toy to be matched with the Apple Object (presumably the original owner of the Toy) gets a increase of 100 Food Points. In the virtual world, the apple may appear as a whole apple.

The second Toy to be matched with the Apple Object (may belong to the same child, or be one of his siblings or close friends') gets an increase of 50 Food Points. In the virtual world, the apple may appear as a half-apple.

The third Toy to be matched with the Apple Object gets an increase of 25 Food Points points. In the virtual world, the apple may appear as a quarter-apple.

The fourth Toy up to the n-th Pokenz Pet to be matched with the same Apple Object may get 10 Food Points. The apple may appear as an apple core.

This novel use of Objects will teach children a number of concepts, including sharing, exchanging, giving and receiving as well as optimizing and strategy. All these interactions will be in the "real world", leading to more interactions between children. Objects will be developed with these types of characteristics, but may be adapted slightly in relation to the game or to the type of object in question (food, clothing, car, jewelry, etc.). Objects may also interact with each-other to generate some result (matching of two same objects provides increase of value, or other form of reward). Children will therefore have the chance of exchanging favors, by sharing their respective objects at different stages in their objects's value-cycle.

While the proposal for a physical object to validate online connections between people contained herein is targeted initially at children, the scope of the invention is much wider in the sense that a similar faun of validation may be used for adult social networking. One example may be for an online community wishing to have very restricted access solely based on person-to-person validation of connections.

A method of use of a device according to the invention works as follows:

The user starts to apply his device with the device of another user according to the description relating to FIG. 5 using the two alignment devices 112. The resulting transaction, which can be a one-way or two-way transaction of information, is stored in the memory module 106. Eventually, he will connect his device to the USB port of any web-enabled computer using the connection module 102. If the device does not have a dedicated connection module 102 the short range communication module can be used, if a short range interface module connecting the web-enabled computer is available. This action will allow the upload of said interactions and the stored information into a database. The database is preferably a database provided by the provider of the device. In such a case, the first time the user does this, he register himself and the device with said provider, before being directed to his favorite social networking website, where the stored contacts are entered in the corresponding database. A widget can be provided to run on the social networking website displaying his Real World contacts and all additional device functionality.

The device can comprise additional functionality, especially an additional switch or input device not shown in the drawings. Such a switch can be a pressure actuator which can be activated through squeezing of the device. If such an actuation takes place in a time interval before the contact according to FIG. 5 is initiated, then the so called "Discrete mode" can be entered. The exchange of identifiers between the devices is then affected, i.e. the device in discrete mode only sends a "ghostID" to the other device instead of his real deviceID. The discrete mode can be visualized thorough optic feedback.

A further functionality relates to the exchange of a "Matching ID" between the devices. It is used to give visual or haptic feedback to the users as to their degree of "matching". This could also give other types of feedback, such as whether the users have friends in common, or 2nd-level contacts in common, whether they worked at the same company, come from the same country, etc. Both devices then glow a certain colour, flash a set of lights, vibrate, head up, or give any other type of visual, auditive or tactile feedback to the user to indicate 1/that the device connection was successful and 2/the degree of "matching" between the two users.

Limited only be memory considerations, each user may repeat many times the above mentioned steps with other users. At some point, a user connects his device to a web-enabled device (presumably a computer, presumably through the device's USB connector). Preferably, a website is automatically launched (may be preceded by a splash screen with an advertiser's name or a company logo) and the data residing on the device, relating to its interactions, is uploaded to said database on the web. This may be done by simply passing all the deviceIDs and timestamps in a URL, which is then parsed by the web server. This may also be done through a small application installed on the user's computer.

The user is asked to which Social Networking environment he would like to be redirected: A third-party site (such as Facebook, Badoo, LinkedIn, etc.) or the device provider's own site. Whether based in a third-party website or in the provider's own site, the user can then interact with Web applets, which enable him to visualize his social network.

A summary of preferred different modes comprises:

The "basic mode": Devices are dormant most of the time. They activate when put in close proximity to one another, or when squeezed i.e. activated. When two devices are put close enough to one another, through use of the physical alignment means, which can be approximately touching and in a preferred embodiment essentially touching, they exchange their unique identifiers as well as, possibly, a "matching" code. Each device then stores the other device's identifier (in volatile or non-volatile memory) along with a time stamp. The exchange is acknowledged to the user with a simple light signal. The device is then ready for the next exchange.

The "Error mode": If at any time during communication a device senses that it has received erroneous data, it enters error mode and displays preferably a specific light signal.

The "Discrete mode": If a user does not wish to communicate his/her identifier in a device exchange, she can squeeze the device, e.g. up to 5 seconds, before the inter-device communication. Her device will receive the other person's identifier but hers will not be revealed. Upon entering this mode, a light signal is displayed.

The "Match mode": In the case where this function has been activated (user preferences controlled by the user in his online account), the light signal acknowledging that the users have used their devices will be different than in "basic mode".

Figure 10:
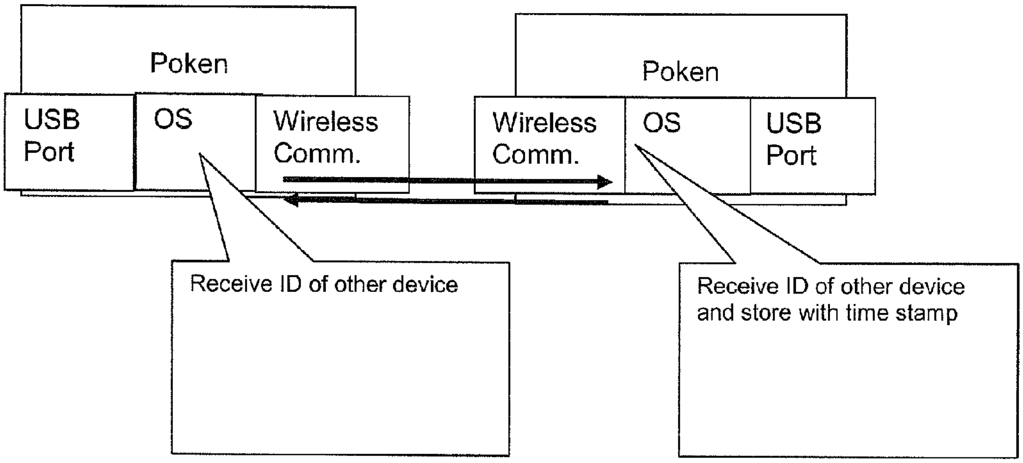
FIG. 10 is a schematical representation of the information flow of a device according to the invention in contact with another device of the invention.

FIG. 10 is a schematical representation of the information flow of a device according to the invention in contact with another device of the invention. The two wireless communication elements are oriented one to the other and the arrows symbolize the exchange of the ID's of the two devices, which are controlled by the operating system and stored within the device.

Figure 11:
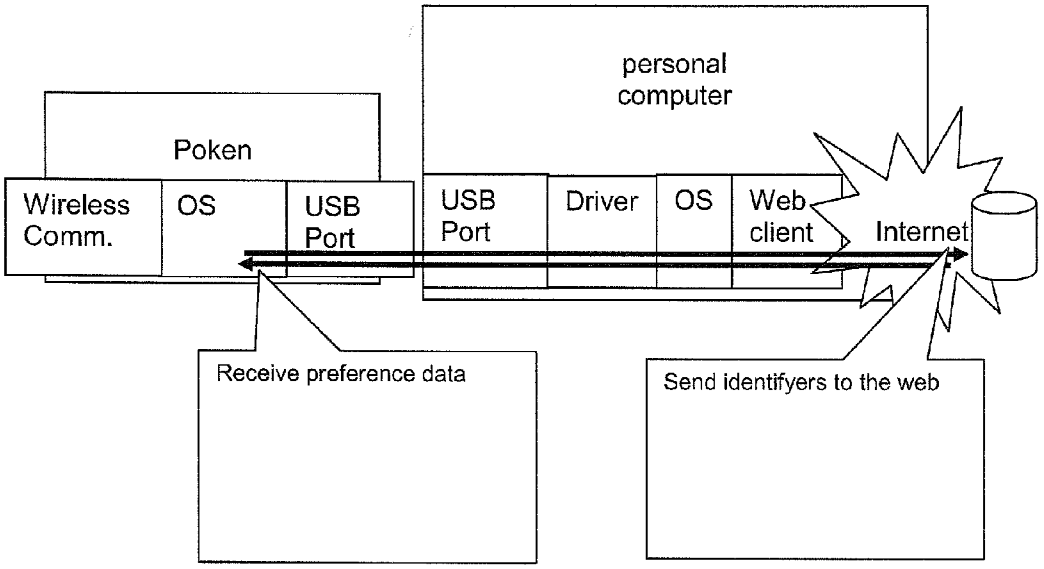
FIG. 11 is a schematical representation of the information flow of a device according to the invention in contact with a personal computer.

FIG. 11 is a schematical representation of the information flow of a device according to the invention in contact with a personal computer. The USB port of the device is connected to an USB port of the personal computer and, since the computer is already connected to the internet, the information flow can be directed to a database in the net. The arrows symbolize the transmittal of identifiers to the web and the reception of preference data to be stored within the device.

Figure 12:
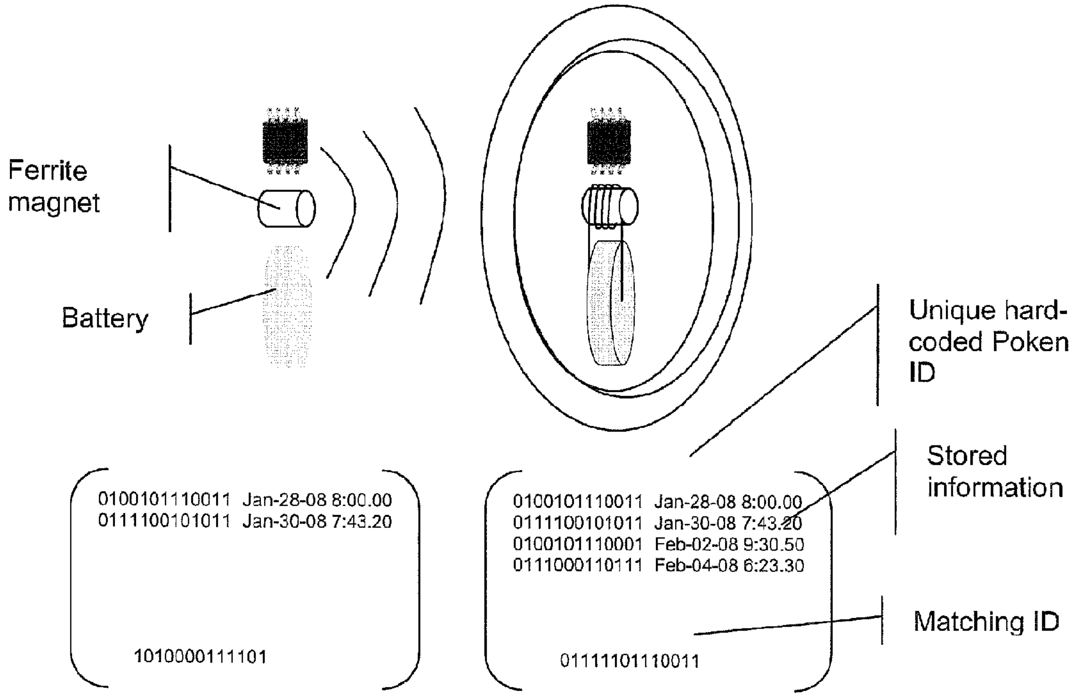
FIG. 12 is a schematical representation of the near-field communication between two devices and an example of the information flow of a device according to the invention.

An embodiment of the wireless inter-device communication is shown in FIG. 12. Very near-field, low-power communication is required between the devices. A magnet (ferrite is a preferred choice of the material) within each device is used to bring them close to each-other at the right spot for the wireless communication to happen.

When the devices come together, the communication is to be activated. The devices may alternately poll all the time, testing for a neighbor, but can also only poll on manual activation, i.e. use of a switch 440. The communication can be very quick—in total, no more than 0.5 sec is preferred.

The battery may be rechargeable through the USB connector. When the device is connected to a computer, it should run off of the computer's USB power.

Figure 13:
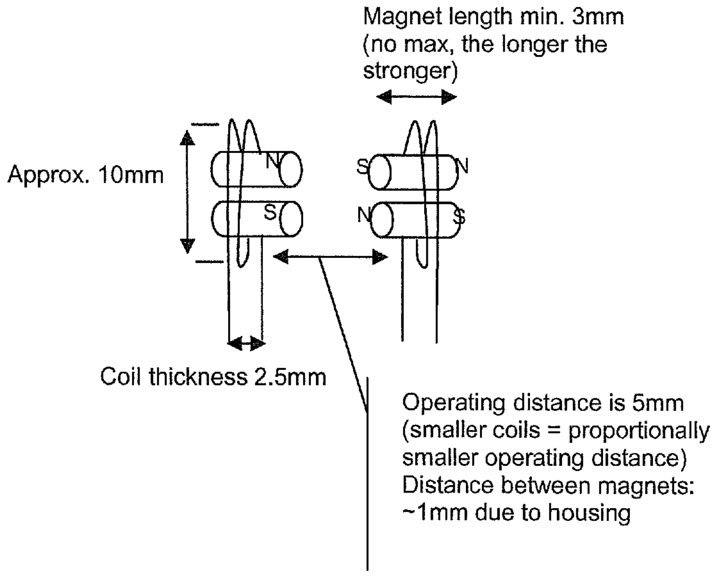
FIG. 13 is a schematical representation of an embodiment of housing and alignment means of a device according to the invention.

FIG. 13 is a schematical representation of embodiments of housing and alignment means of a device according to the invention showing a device using two magnets so that devices can be face-to-face.

Figure 14:
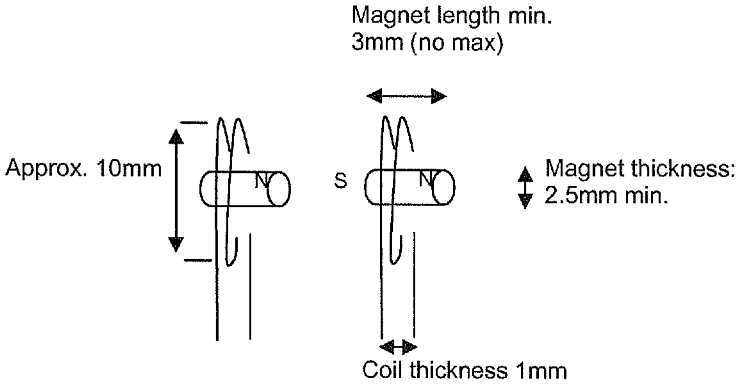
FIG. 14 is a schematical representation of a further different embodiment of housing and alignment means of a device according to the invention.

FIG. 14 is a schematical representation of a further embodiment of housing and alignment means of a device according to the invention showing the use of single magnets, so that devices connect back-to-back or side-to-side.

Additionally the present invention is directed to methods and systems for use in playing lottery, gambling, or otherwise engaging in games of chance or other games such as can be used for sales promotions, customer retention programs, social networking events, advertising, dating games as well as other events where people interact. The terms lottery, gambling, and games of chance refer generally to games in which one or more individuals (referred to herein as "players") can engage, and in which the outcomes of game-plays are random or otherwise unpredictable. The term "game" refers to a set of rules and procedures which define the series of actions or events (i.e., the "course of play") leading to a game outcome. A game outcome may be positive (a "win") or negative (a "loss"). A game outcome may include multiple outcomes, for example in games in which multiple players can win or lose. A game outcome may be influenced by odds of winning, as well as by actions taken or events occurring during a game. A "game-play" is an action or a series of actions or events that are under a player's control and that can give rise to a game outcome. A game-play may include, for example, the purchasing of a game piece by a player or the wagering of a game piece.

The methods and systems described herein allow players of games of chance to take active roles in the games they engage in by providing the players with the ability to influence the odds and/or the outcomes of their game plays. The methods and systems also allow players to engage in multiple games, multiple game-plays, or various combinations of games and game-plays using a single game piece or multiple game pieces.

In one embodiment of the invention, a player may engage in a game of chance by using one or more game pieces. Game pieces may take multiple physical forms including tickets, tokens, chips or poker-chips, or similar devices. Game pieces may also take virtual forms including electronic data (e.g., a cookie, a digital packet, or other set of digital data), or other data such as unique combinations of numbers, letters, or other identifiers. Game pieces may be uniquely identifiable, but may also be identifiable by "batch" or by "type" (a plurality of game pieces having the same identifier), and may also be generic. In a preferred embodiment of the invention, a game piece may take the form of an electronic device which is uniquely identifiable or whose "type" is uniquely identifiable.

Figure 15A:
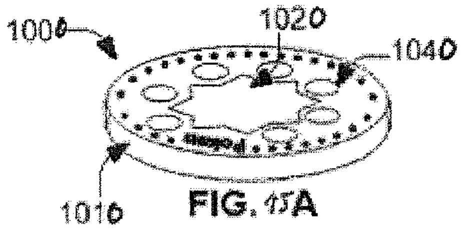
FIGS. 15A-F show schematic diagrams of e tokens in accordance with the principles of the invention.
Figure 15B:
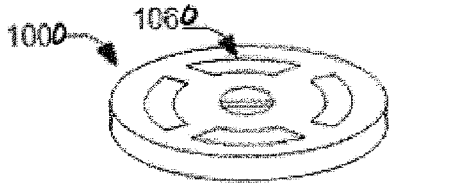
Figure 15C:
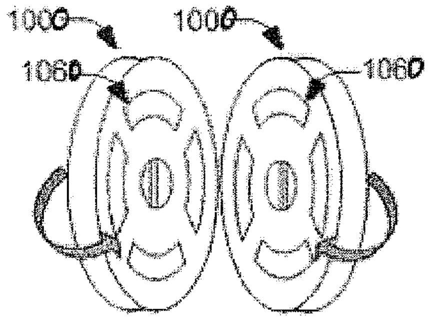
Figure 15D:
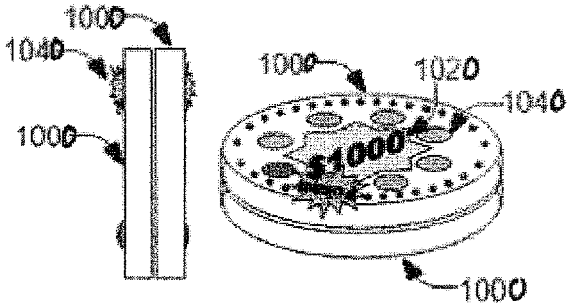
Figure 15E:
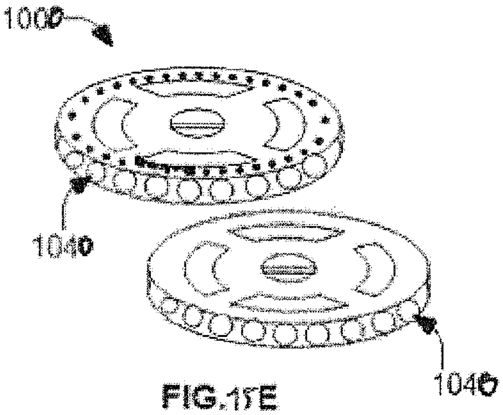

FIGS. 15A to 15F show illustrative embodiments of electronic game pieces or "e-tokens" 1000 in accordance with the principles of the invention. E-tokens 1000 may include a decorative and protective casing 1010. Casing 1010 is token shaped and has the approximate dimensions of a poker chip with a diameter of approximately 3 cm and a thickness of approximately 0.5 cm. Other shapes and sizes of casing may also be used. Casing 1010 may include decorative features. At least one surface of casing 1010 may include one or more LEDs 1040, LCD displays 1020, or other displays or lights as shown in FIG. 15A. LEDs 1040 and LCD displays 1020 may also be placed on other surfaces of casing 1010, for example on the outside edge of a poker-chip shaped token as shown in FIG. 15E. LEDs 1040 and LCDs 1020 may be used to provide visual feedback to a player indicating that the e-token has entered a new state or that the player has won a prize. FIG. 15D shows two views of e-tokens 1000 in which LEDs 1040 are lit up and LCD 1020 displays a text message, thereby providing visual feedback to a player. Other feedback means may be incorporated into e-token 1000 and casing 1010. For example, auditory feedback means such as a speaker or buzzer may be mounted inside casing 1010. User input means such as pushbuttons may also be included on casing 1010.

In embodiments in which e-token 1000 communicates with other e-tokens 1000 and/or with an e token reader 1080 (also referred to as "game piece reader) through a wired or wireless connection, casing 1010 may include one or more electrical contacts 1060 on at least one casing surface, as shown in FIG. 15B. Electrical contacts 1060 may also be used to charge a battery in e-token 1000. The visual display devices 1020 and 1040 and electrical contacts 1060 may be on the same or different surfaces of casing 1010.

FIG. 15C shows two e-tokens 1000 being stacked together such that they come into electrical contact or wireless communication with each other. Tokens 1000 may be substantially lined up with each other such that electrical contacts 1060 on their surfaces come into electrical contact when the tokens form a stack. Various features of the external casing 1010 or its content (such as a magnet) may be designed such that e-tokens 1000 stack together neatly and remain stacked unless pulled or taken apart. Casing 1010 design features may also be used to ensure that the electrical contacts 1060 on adjacent e-tokens in a stack line up with each other and form stable electrical connections. Once two e-tokens are coupled to each other (through electrical contacts 106 or a wireless connection), various LED lights 1040 or LCD displays 1020 may light up to indicate that a connection has been made as shown in FIG. 15D.

Figure 15F:
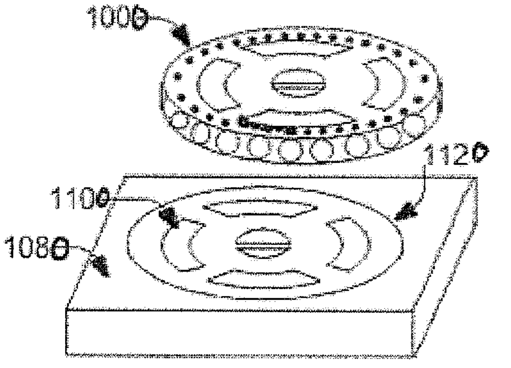

FIG. 15F shows an e-token reader/writer 1080 (or "game piece reader/writer") on top of which may be stacked a plurality of e-tokens 1000. Token reader 1080 may include electrical contacts 1100 or casing design features 1120 which are complementary of the electrical contacts 1060 or casing 1010 features of tokens 1000. Electrical contacts 1000 may be used to communicate with and/or recharge e-tokens that are coupled to reader 1080. The "game piece reader/writer" may also take the form of a vending machine such as a lottery ticket vending machine or a coin-operated bubble-gum machine or another form of vending machine such that a person may purchase or otherwise extract a game piece from it. The game piece reader/writer may serve the purpose of storing the game pieces until they are extracted as well as programming them when a user inputs some information (such as a personal selection of numbers). It may be used as a vending machine which dispenses game pieces upon payment, and may also be used to re-collect game pieces after use (for example, for purposes such as recycling or reprogramming).

Figure 16:
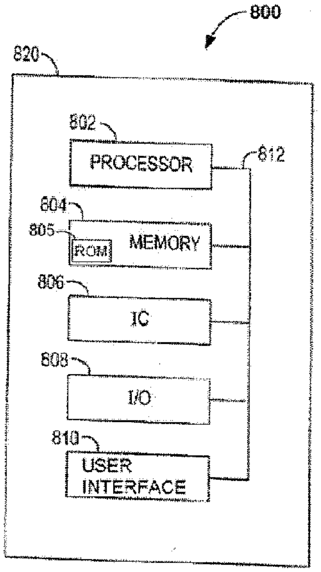
FIG. 16 shows a schematic diagram of circuitry that may be used in an e-token in accordance with the principles of the invention.

FIG. 16 shows illustrative circuitry 800 which may be used to implement the functionality of e-token 1000. Circuitry 800 may take the form of an integrated circuit 820, an application specific integrated circuit ("ASIC"), a programmable logic device ("PLD"), circuitry mounted on a circuit board, or any combination of circuitries. Circuitry 800 may include any of a processor 802, a memory 804 including a read-only ROM memory 805, an integrated circuit 806 including programmable PLD and/or ASIC circuitry, a transceiver 808 or other input/output circuit, and a user interface circuit 810. The components of circuitry 800 may be coupled to each other and communicate through a system bus 812. Circuitry 800 may include additional elements than those shown in FIG. 16. For example, circuitry 800 may include a clock and/or a battery.

Processor 802 and/or integrated circuitry 806 is operative to control the operation of circuitry 800. Processor 802 and integrated circuitry 806 may rely on game data stored in memory 804 to operate. Game data for one or more games may be stored in memory 804. The game data may be stored in read-only memory or in read/write memory. Memory 804 may also include ROM 805 storing an identifier used to identify an e-token. The identifier stored in ROM 805 may be a unique identifier used to uniquely identify a particular e-token, or a "batch" identifier used to identify a particular type of e-token. Transceiver 808 may be used to enable communication between circuitry 820 and other e-tokens, between circuitry 820 and an e-token reader, and/or between circuitry 820 and WIFI, LAN, RFID, or other networking circuitry, and/or between circuitry 820 and other circuitry used in conjunction with an e-token. Transceiver 808 may be used for wired or wireless communication, and may be coupled to metal contacts located on the casing of e-token 1000 and/or to an antenna or other wireless communication device located within e-token 1000. User interface circuitry 810 may include one or more LED diodes 1040, LCD displays 1020, or other user interface devices including buzzers and speakers. User interface circuitry 810 may also include one or more buttons or other user input devices.

The e-tokens described in connection with FIGS. 15A-F and 16 may be used in a wide variety of games of chance. E-tokens may replace the tickets and scratch cards used in ILGs and DBLGs or in Sales Promotion games, Customer Retention games, Social Networking games, Dating games, etc. Different e-tokens may be used for different games and different lotteries. The e-tokens used in different games and lotteries may differ in their casing shape, size, styling, and appearance, communication, electronic and processing capabilities, or in other respects. Alternatively, identical e-tokens may be used in different games and lotteries. The particular game or games that an e-token is used in may be determined by the e-token reader that the e-token is connected to at the time of play. The particular game or games that an e-token is used in may be determined by the number or types of e-tokens connected in a stack, by user input (e.g., by a user pushing a button mounted on the e-token casing or reader), or through other appropriate means.

REFERENCE NUMERALS

100 device
102 connection module
104 processor module
106 memory module
108 wireless communication device
110 communication module
112 alignment device
114 compact power source
200 device
210 main body portion
212 USB plug
214 hole
216 physical alignment device
290 device w/o communication module
320 smart fob I
322 smart fob II
324 physical alignment device
326 physical alignment device
330 smart fob III
332 smart fob IV
340 smart fob V
342 smart fob VI
400 toy
410 compact apparatus
420 physical alignment device
430 connection module
440 switch
450 LED
800 circuitry
802 processor
804 memory
805 ROM memory
806 integrated circuit
808 transceiver
810 user interface circuit
812 system bus

820 integrated circuit
1000 token
1010 casing
1020 LCD display
1040 LED diodes
1060 electrical contacts
1080 token reader
1100 electrical contacts
1120 casing design

What is claimed is:

1. A compact communication apparatus, comprising:
a processor module;
a memory module;
a wireless communication interface; and
a mobile power source;
wherein the wireless communication interface comprises:
a short-range wireless communication module, and
a physical alignment device usable for aligning the compact communication apparatus with another compact communication apparatus containing a similar wireless communication interface such that data communication can happen between the wireless communication modules;
wherein the processor module is adapted to act on the data received from the wireless communication module and to store some related data, especially variables, to the memory module;
wherein the mobile power source is contained within the compact communication apparatus and provides the power to run at least said apparatus' wireless communication interface and processor module,
wherein the physical alignment device comprises a cartoon-style hand having a palm and extended fingers, wherein the wireless communication module comprises an antenna placed in said palm of the cartoon-style hand, wherein the alignment is achieved when the two devices are placed against each-other palm-to-palm, and wherein the wireless communication can happen when the devices are at most 1 to 5 mm from each other and placed with the palms essentially facing each other.

2. The compact communication apparatus of claim 1, further comprising a connection module for interfacing the compact apparatus with an Internet-capable appliance.

3. The compact communication apparatus of claim 2, further comprising an inductive coil wrapped around a magnet that serves as a conduit for the communication signal.

4. The compact communication apparatus of claim 1, wherein the physical alignment device contains at least one magnet adapted to help or allow aligning said compact apparatus to another compatible compact apparatus in such a way that the short-range wireless communication circuitry of both devices can communicate.

5. The compact communication apparatus of claim 1, wherein the physical alignment device has a physical shape which is adapted to help or allow aligning said compact apparatus to another compatible compact apparatus in such a way that the short-range wireless communication circuitry of both devices can communicate.

6. The compact communication apparatus of claim 1, wherein the Internet-capable appliance comprises a device selected from the group consisting of personal computer (PC), laptop, PDA, MP3 player, cellphone, and similar Internet-capable devices; and the interface with the Internet-capable appliance is selected from the group consisting of USB, FireWire, IR, Bluetooth, standard serial port, WLAN, NFC and RFID.

7. The compact communication apparatus of claim 1, wherein the wireless communication circuitry comprises an RF antenna and a modulator.

8. The compact communication apparatus of claim 1, further comprising at least one switch which may be used for activating the communication module of the compact apparatus for a predetermined time interval, or may be used to make the device enter another mode.

9. The compact communication apparatus of claim 1, further comprising at least one LED for showing the operating mode of the apparatus.

10. The compact communication apparatus of claim 1, wherein the mobile power source is of the group comprising: a standard battery, a rechargeable battery, a capacitor, a solar cell, a fuel cell, or any other compact portable power source.

11. The compact communication apparatus of claim 1, wherein the connection module, processor module, memory module and wireless communication module are embodied in a form of an apparatus having a general physical configuration of a conventional USB memory fob, or are embedded within another apparatus having a general physical configuration of a children's toy.

12. The compact communication apparatus of claim 1, wherein the information collected by the apparatus in the Real World via its wireless communication interface, is used for linking in the Virtual World the owners of the compact apparatuses which have shared data between them in the Real World, such that those same owner individuals can communicate with each other on at least one of a Social Networking website, a games site, another type of website, or a digital address book.

13. The compact communication apparatus of claim 1, wherein the memory of the compact apparatus is adapted to store information received through the wireless interface and wherein the memory is adapted to provide the information to the host processing device via the standard interface, thus allowing a complete information exchange between the virtual world and the real world.

14. The compact communication apparatus of claim 13, wherein the information stored in the compact communication apparatus is used for personal identification, secure network logon, access control, e-ticketing, or e-payment applications using either the standard compliant interface or the wireless interface.

15. The compact communication apparatus according to claim 1, wherein the distance between two antennas within two devices can be under-run only when the extended fingers are mechanically oriented in a specific orientation.

16. Method of exchanging data, comprising:
providing two individuals each with a compact communication apparatus containing at least: a processor module, a compact mobile power source and a wireless communication interface; said wireless communication interface comprising a wireless communication module and a physical alignment device to help align said device with another compatible device, the first device being capable of transferring data to the second device through their wireless communication modules conditional to the proper physical alignment of the devices as defined by said physical alignment device; the individuals positioning their devices in such a way that the data transfer can occur,
providing the physical alignment device in the form of a cartoon-style hand having a palm and extended fingers,
providing the wireless communication module with an antenna configured to placed in said palm of the cartoon-style hand, and allowing wireless communication to occur when the two devices are placed against each-other palm-to-palm, and the devices are at most 1 to 5 mm from each other and placed with the palms essentially facing each other.

17. Method according to claim 16, further comprising interfacing the second device, which would contain a connection module, through its connection module to an Internet-capable appliance such that the data transferred from the first device is made available to applications running on the Internet-capable appliance or to applications on the Web, wherein the interface with the Internet-capable appliance being selected from the group consisting of USB, FireWire, IR, Bluetooth, standard serial port, WLAN, RFID, NFC, Wifi.

18. Method of linking the profiles of individuals in the Virtual World of the Internet by having said individuals engage in a Real World transaction using a compact apparatus provided primarily for this purpose, comprising:

providing both individuals with a compact apparatus, comprising: a means for moving data between two similar apparatuses using a short-range wireless communication module within each apparatus;

providing a physical alignment device on each of the compact apparatus in the form of a cartoon-style hand having a palm and extended fingers;

providing a wireless communication module in each of the compact apparatus with an antenna configured to placed in said palm of the cartoon-style hand;

allowing wireless communication to occur when the two compact apparatuses are placed against each-other palm-to-palm, and the two compact apparatuses are at most 1 to 5 mm from each other and placed with the palms essentially facing each other;

having the individuals interact in the Real World by positioning their respective apparatus in close proximity such that a least one digital identifier is exchanged between them once wireless communication is allowed; and having at least one of the individuals connect his compact apparatus to a host Internet-capable appliance through a connection module which one of the compact apparatuses comprises, such that the information relating to the exchange of identifier is transferred to an application running on the host or to an application on the web.

19. The method of claim 18, wherein one of the individuals involved in the transaction may not be a person, but rather a booth or any a location where a compatible apparatus may have been placed for the purpose of interacting with it.

20. Method of restricting the interaction of individuals in the Virtual World of the Internet to interactions between those same individuals that each individual may have interacted with in the Real World, said method comprising:

providing a compact apparatus to each individual, having the individuals interact in the Real World by positioning their respective apparatus in close proximity such that a least one digital identifier is exchanged between them;

providing a physical alignment device on each of the compact apparatus in the form of a cartoon-style hand having a palm and extended fingers;

providing a wireless communication module for moving data between two similar apparatuses in each of the compact apparatus with an antenna configured to placed in said palm of the cartoon-style hand;

allowing wireless communication to occur when the two compact apparatuses are placed against each-other palm-to-palm, and the two compact apparatuses are at most 1 to 5 mm from each other and placed with the palms essentially facing each other; and having at least one of the individuals connect his compact apparatus to a host Internet-capable appliance such that the information relating to the interaction of the individuals in the Real World is transferred to an application running on the host or to an application on the Web; said apparatus, comprising: a connection module for interfacing the personal token apparatus with an Internet-capable appliance; a processor module for processing the data passed to and from the wireless communication module; a compact power source providing power to the processor module and to the wireless communication module.

21. The method of claim 20, wherein one of the individuals involved in the transaction may not be a person, but rather an object onto which a compatible apparatus may have been affixed for the purpose of interacting with it.

* * * * *